US006431241B1

(12) United States Patent
Gonzalo

(10) Patent No.: US 6,431,241 B1
(45) Date of Patent: Aug. 13, 2002

(54) ROLL-FED LABELLING APPARATUS

(75) Inventor: Rick Gonzalo, Turlock, CA (US)

(73) Assignee: Carmichael (Scotland) Limited, Edinburgh (GB)

(*) Notice: Subject to any disclaimer, the term of this patent is extended or adjusted under 35 U.S.C. 154(b) by 0 days.

(21) Appl. No.: 09/180,491

(22) PCT Filed: Nov. 6, 1997

(86) PCT No.: PCT/GB97/02963

§ 371 (c)(1), (2), (4) Date: Apr. 19, 1999

(87) PCT Pub. No.: WO98/19916

PCT Pub. Date: May 14, 1998

(30) Foreign Application Priority Data

| | | |
|---|---|---|
| Nov. 7, 1996 | (GB) | 9623218 |
| Feb. 15, 1997 | (GB) | 9703173 |

(51) Int. Cl.[7] .......... B32B 31/00; B26D 1/00; B65C 9/18

(52) U.S. Cl. .......... 156/518; 156/521; 156/530; 156/537; 156/556; 156/256; 83/56; 83/701

(58) Field of Search .......... 156/521, 256, 156/516, 517, 529, 530, 531, 556, DIG. 9–13, 518; 83/13, 343, 344, 346, 347, 348, 349, 56, 701

(56) References Cited

U.S. PATENT DOCUMENTS

| | | | | | |
|---|---|---|---|---|---|
| 3,757,624 | A | * | 9/1973 | Kruse et al. | 83/271 |
| 4,001,073 | A | * | 1/1977 | Jones et al. | 156/516 |
| 4,108,706 | A | * | 8/1978 | Brands et al. | 156/384 |
| 4,632,721 | A | * | 12/1986 | Hoffmann et al. | 156/458 |
| 4,844,760 | A | * | 7/1989 | Dickey | 156/215 |
| 5,897,722 | A | * | 4/1999 | Bright | 156/86 |

FOREIGN PATENT DOCUMENTS

| | | | |
|---|---|---|---|
| WO | 94/15842 | * | 9/1994 |

OTHER PUBLICATIONS

Southwick, "A Study in Machine Development", Modern Packing, vol. 33, No. 7, pp. 201–207, XP002055649, Mar. 1960.*

* cited by examiner

*Primary Examiner*—Linda Gray
(74) *Attorney, Agent, or Firm*—Clifford W. Browning; Woodard, Emhardt, Naughton, Moriarty & McNett Patent and Trade Attorneys

(57) ABSTRACT

A Roll-fed labeling apparatus is disclosed which includes a delivery means for delivering a label web to a rotary cutting drum, and one or more cutting assemblies located on the cutting drum providing cutting means for cutting with a slicing action the web into individual labels while the web is held by a relatively negative pressure on the circumferential surface of the drum. Each of the cutting assemblies comprises a piston arranged to move the cutting means along a slot on the cutting drum to enable the slicing action to take place. The slicing action is not dependent upon a surface auxiliary to the cutting means.

14 Claims, 4 Drawing Sheets

ROLL-FED LABELLING APPARATUS

Figure 1:
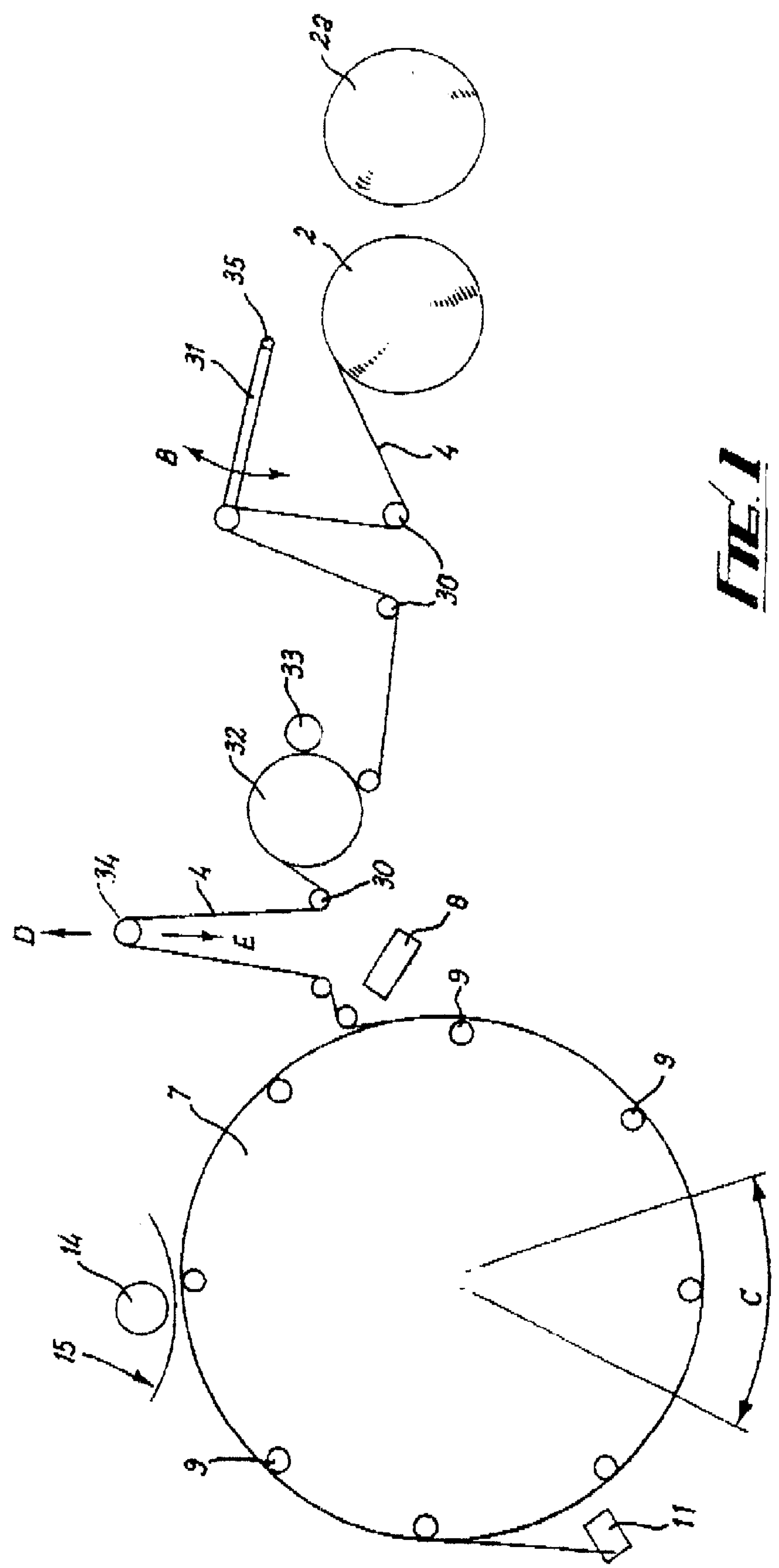

This invention relates particularly to roll-fed labelling apparatus as may be used for applying labels taken from a label web to a variety of articles. Such articles are often containers found in production, packaging and bottling of drinks, foods, household products, toiletries, oils, paints and the like and manufacture of plastic, glass, metal and other containers.

In conventional roll-fed labelling apparatus a label web is taken from a label roll stand and delivered via label feed and tensioning apparatus to a cutter drum. In order to maintain the tension in the label web, the cutter drum rotates at a faster velocity at its circumference than the supplied web, requiring an immediate acceleration of the web. In practice, unless there is an appropriate degree of slippage of the label on the drum, the label will stretch undesirably or even tear. However, the requirement of catering for such slippage is itself problematic, imposing demanding specifications on the coefficients of friction of the drum surface, and in respect of the registration and glue application processes. Typically, after the web is cut into individual labels, the labels are passed on to an adjacent vacuum drum. The vacuum drum also rotates at a faster velocity than the cutter drum, and thus the aforementioned requirements relating to slippage also apply at this stage.

The labels may then be coated on their back face with an adhesive, typically at their leading and trailing edges and then passed from the vacuum drum to respective containers or articles brought into juxtaposition with the label on the vacuum drum by a turret or other conveyor.

The apparatus for applying the adhesive to the label generally includes a further wheel or roller having a knurled or shaped surface and glue wires which are positioned to prevent labels from dislodging from the vacuum drum and falling into the gluing apparatus or other equipment, causing breakage, inefficiencies and down time. These glue wires, however, have been found to be unreliable themselves, breaking from time to time and giving rise to the above problems.

Thus it may be seen that labelling machines conventionally have used a series of rotating drums for the transport of labels through a series of stages. The labels are transferred from the surface of one drum to the surface of the next drum, and the labels are generally held on the surface of the drum by a vacuum.

The relative speeds of the drums are critical and even a slight error in the speed of one of the drums can lead to substantial problems or inefficiencies. Such errors may be hard to avoid in view of unpredictable and inconsistent levels of slippage and label stretch, causing labels to be wrinkled or creased as they are transferred from one drum to the next.

An object of the present invention is to reduce the risk of such wrinkling or creasing by simplifying the process required to register and cut the label web, and thereafter applying adhesive to the labels. In one aspect, the invention enables this by enabling more of these processes to be undertaken while the label is on a single drum, thereby also reducing the requirement of transferring labels from one drum to another.

U.S. Pat. No. 4,632,721 Hoffmann goes some way in attempting to meet the aforementioned objective. Hoffman teaches the use of a knife carried directly on a vacuum drum in an attempt to negate the requirement of a separate cutter drum. However, Hoffmann teaches the need for an interaction between the vacuum drum and stationary blades which together sever or shear each label from a continuous web. Glue applying rollers are also positioned in close proximity to the vacuum drum. However, a disadvantage of the art taught by Hoffmann is that it the gripping pads, which act to hold the label to the vacuum transport drum, require to retract and protrude at appropriate and exact times during the rotation of the drum in order to avoid interference with the stationary blades in one case and to cause the label to press against the glue rollers in another case. Thus, Hoffmann does not entirely overcome the need to provide for precise relative speeds of one mechanism in relation to another. It is also noted in the present invention that the act of shearing or severing label web between a moving blade and a stationary blade is not entirely satisfactory. Thus, an object of the present invention is to mitigate these disadvantages in the art.

Further objects of the present invention will become apparent from the following statements and description.

According to a first aspect of the present invention there is provided a roll-fed labelling apparatus comprising delivery means for delivering a label web to a rotary cutting drum, and one or more cutting means associated with the cutting drum for cutting the label web into individual labels while held by a relative negative pressure on the circumferential surface of the drum, the apparatus being associated with a container delivery means whereby containers are delivered into juxtaposition with separated labels located on the rotary cutting drum to enable transfer of the said separated labels to respective containers.

Preferably the cutting means are provided on or near the circumferential surface of the drum.

Preferably the cutting means comprises a sharp edged or pointed device or instrument. The cutting means may be a blade. Alternatively said cutting means may be a heated device or appliance, a water, ultrasonic or laser cutting device, or any device for cutting the web into individual labels.

Where there are a plurality of cutting blades, at each blade there may be provided a slot in the outer circumferential surface of the rotary cutting drum and preferably at least part of the cutting edge of each blade protrudes through the slot allowing contact of the blade with the label web on the cutting drum. The blade may be connected to a piston located within a cylinder wherein movement of the piston and blade is provided by a relative change in air pressure across the piston. Preferably, the means for providing a relative negative pressure at the outer circumferential surface of the rotary cutting drum is also used, when required, to provide the relative pressure change across the piston in the cylinder. Other devices such as mechanical, electromechanical, pneumatic or hydraulic devices may be used in place of the piston.

According to a second aspect of the present invention the aforesaid delivery means is such that the label web is delivered to the rotary cutting drum under a low or negligible tension. The delivery means may comprise a free loop mechanism for this purpose.

An advantage of this is that minimal, negligible or even zero slippage may occur in respect of the label web or individual labels on the rotary cutting drum. Furthermore, as the label web is supplied at a relatively low or negligible tension, the label web is not caused to stretch or tear and materials of low tensile strength may be used.

According to a third aspect of the present invention the roll-fed labelling apparatus further comprises an adhesive applicator provided in close proximity to the rotary cutting drum to enable labels to receive adhesive prior to their transfer to their respective containers.

Preferably the adhesive applicator comprises means for spraying adhesive onto the back faces of the labels. Preferably, the adhesive applicator has means for pulsing the spray such that the adhesive is ejected onto the leading and trailing edges of the labels.

Alternatively, the adhesive applicator may be arranged to spray the adhesive in a pattern such that the leading and trailing edges of adjacent labels are applied with adhesive in a single action. The rotary cutting drum may be provided with an angular profile at each slot and the adhesive applicator may also be positioned at an angle to the radius of the cutting drum so that contamination of the slot during supply of the adhesive may be reduced or minimised.

Figure 2:
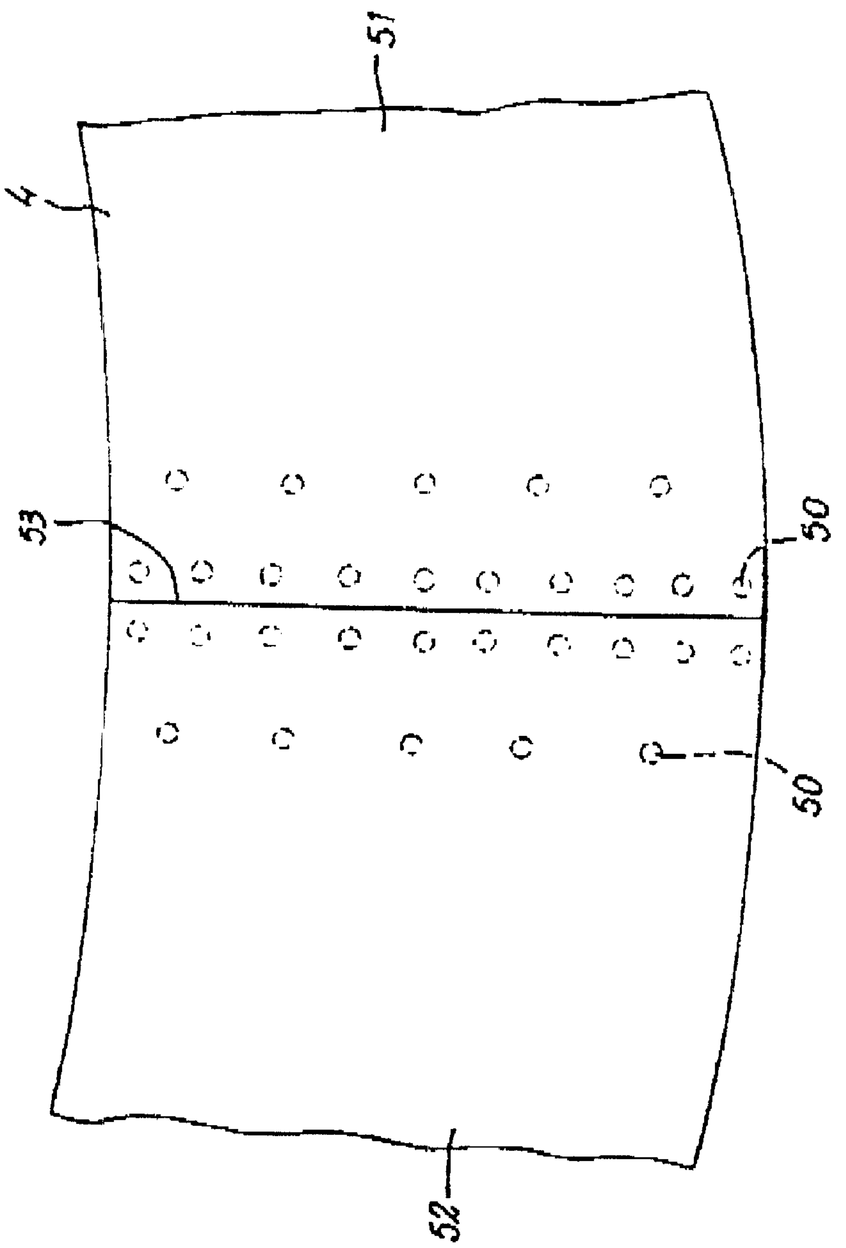
Figure 3:
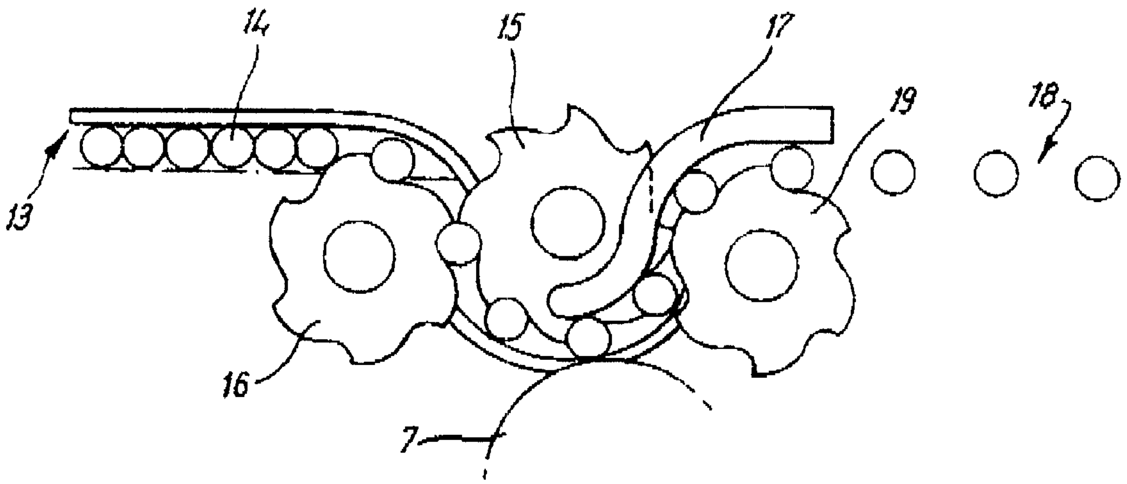
Figure 5:
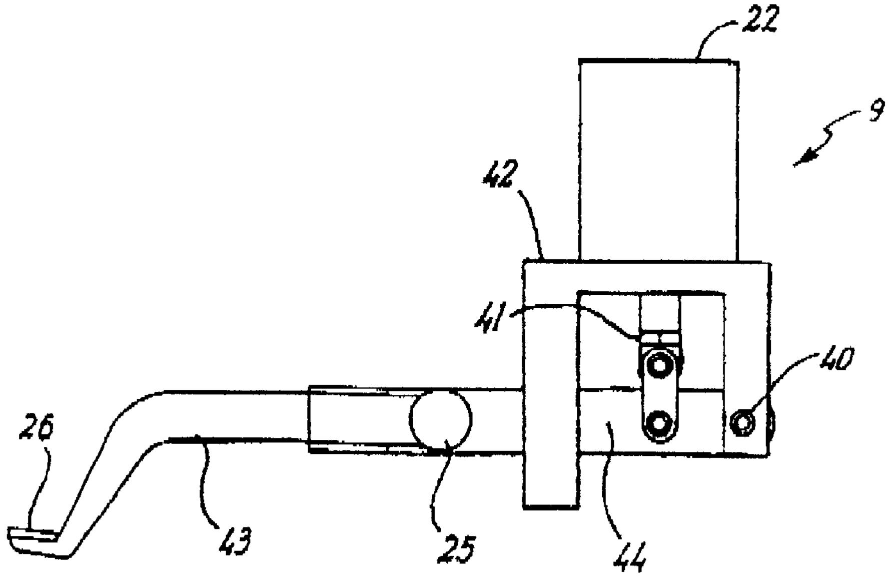
Figure 4A:
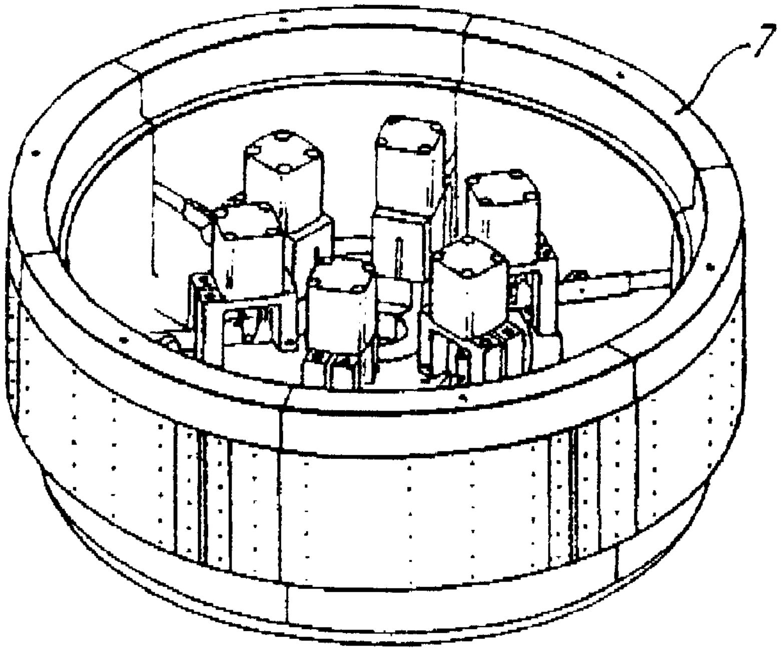
Figure 4B:
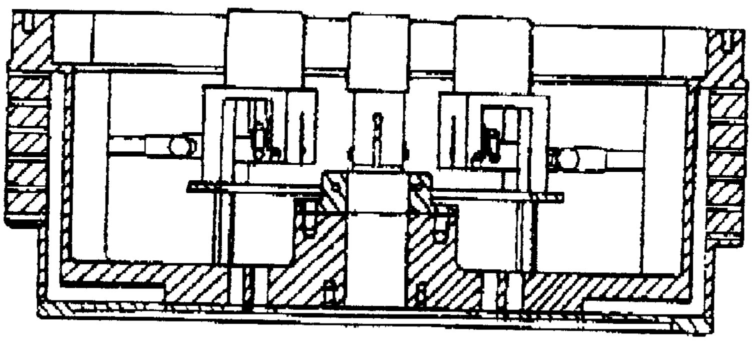

An embodiment of the invention will now be described, by way of example only, with reference to the accompanying drawings, in which:

FIG. 1 is a schematic view of roll-fed labelling apparatus in accordance with the invention, FIG. 2 is a front elevation of the area marked C on the rotary cutting drum shown in FIG. 1, FIG. 3 is a schematic plan view of example container delivery means used in association with the invention, FIGS. 4*a* and 4*b* show respectively, a perspective arid sectional elevation of a cutter drum assembly, and, FIG. 5 shows a cutter assembly used on the rotary cutting drum for cutting a label web into individual labels.

Referring firstly to FIG. 1 and FIG. 2, a label web 4 is stored on the label roll stand 2. An optional second roll stand 2*a* may also be provided to enable quick changeover of label web supply when one roll is diminished.

From the label roll stand 2 the label web 4 is fed via delivery means to a rotating cutting drum 7. The delivery means includes a series of roller guides 30, a tension control arm 31, a label feed roller 32 and pinch roller 33, and a tension negating roller 34. The tension control arm 31 is biased in the direction of arrow B so as to provide tension to the label web 4 ensuring that it is pulled off the label roll 2. The tension control arm 31 is pivotal about the fulcrum 35 such that constant and safe tension may be maintained on the label web 4 at this stage of the delivery.

However, after the label web 4 has passed between the label feed roller 32 and pinch roller 33 it is guided around a tension negating roller 34. The roller 34 is movable in the directions of D and E, there being a bias imposed on the roller 34 in the direction of D, although this bias is far less than the bias on the tension controller 31, such that at this location a negligible tension is applied to the label web 4, that is the label web 4 travels through a free loop after it passes the roller 34.

Accordingly, the label web 4 is delivered to the rotary cutting drum 7 at a negligible tension and such that the face of the labels are in contact with the external circumferential surface of the rotary cutting drum 7, the backface of the labels being exposed outwardly.

Registration means 8 is associated with the rotary cutting drum 7 and adapted to register the position of the leading and trailing edges of the individual labels, ensuring that such are aligned with respective cutters 9 on the cutting drum 7.

In use, the rotary cutting drum 7 rotates in a clockwise direction and transports the label web 4 to the area C at which the cutter is activated by a change in relative air pressure across a piston, the details of which are described below with reference to FIG. 4. To ensure a clean cutting action the relative negative air pressure is increased on the outer circumferential surface of the rotary cutting drum 7 in the vicinity of the label web 4 at the location of the cut (c). This may be seen from FIG. 2 which shows the elevation of the outer circumferential surface of the rotary cutting drum 7 in the area marked C in FIG. 1. The holes 50 are the outlets of conduits for sucking air or otherwise reducing air pressure in the area of the holes 50 upon the surface of the rotary cutting drum 7. As the tension in the label web is negligible, zero or negligible slippage of the labels occur after they have been cut and thus negligible spacing appears between adjacent labels after the cutting action takes place. This means that (as shown in FIG. 2) the leading edge of a label 51 abuts the trailing edge of an adjacent label 52 at the cut line 53.

With the labels positioned in such abutment they are transported by the rotary cutting drum 7 in a further clockwise rotation to a glue station at which is located a glue or adhesive applicator 11. The applicator 11 is an extrusion die and eliminates the need for guide wires. Hot melt adhesive may be applied to the front and trailing edges of each cut label, the applicator 11 spraying the adhesive in a pulse like manner, the timing of which may be synchronised by the registration of equipment 8. In one embodiment, the adhesive may be applied to the leading and trailing edges of adjacent labels simultaneously because the cutter drum 7 is designed to cut labels without creating any substantial gap between the separated labels. The adhesive applicator can be left on at all times for complete coverage without the need for on/off timing. A typical arrangement of the adhesive applicator 11 as described below with reference to FIGS. 5 and 6. It should be noted that the present invention is not limited by the type of applicator or adhesive used. Indeed, the use of a glue applicator is not itself essential and other methods may be employed for attaching labels to respective containers. Moreover, if an adhesive is to be used, the adhesive may be applied to all of the backside of the label, or only part thereof, such as the front and trailing edges as hereinbefore mentioned.

As shown in FIG. 3, the apparatus further includes a container delivery means which typically comprises a conveyer 13 which delivers containers 14 onto a star wheel 15 via an infeed star 16. An infeed scroll (not shown) may be used in place of or in combination with the infeed star 16. The infeed star 16 ensures that the containers are positioned on the star wheel 15 with correct positioning such that they are appropriately spaced apart for correspondence with delivery of the cut and glued individual labels being transferred from the rotary cutting drum 7 at a point where the star wheel 15 and drum 7 come into contact or near contact.

The labels are wrapped around their respective containers via a fixed or moving roll down pad and guide 17, after which they are returned to a conveyor 18 by the discharge star 19. It is recognised in the present invention that there are various methods used for delivering containers 14 to roll fed labelling apparatus and the present invention is not limited to the embodiment described herein. For example, it is envisaged that a rotary turret in which containers 14 are clamped in upper and lower chucks may be used in place of the star wheel 15, the containers being rotated by means of a drive belt before coming in contact with a roll down pad and guide. As mentioned above an infeed scroll may be used in place of or in combination with the infeed star 16.

Turning now to FIG. 4, a cutter drum assembly is illustrated having six cutter assemblies, also referred to as separating means herein. A side view of a cutter assembly 9 in the rotary cutting drum 7 is illustrated in FIG. 5.

The cutter assembly 9 in the example embodiment comprises a cylinder 22 mounted on a frame 42 which drives a link 41 connected to a pivotal arm 44. The arm 44 pivots about the pin 40 and provides a connection means 25 for a blade holder 43 with cutting blade 26. The connection means allows for the adjustment or replacement of the blade holder 43. Similarly, the cutting assembly may be designed to allow for the efficient replacement of the blade 16. In use the blade 26 protrudes through a respective slot 53 in the cutter drum 7 to enable a cutting or separating action to take place.

The piston 22 may be electro-mechanical, pneumatic or of any other suitable type.

It should be noted that the invention extends to any method of separating, parting, severing or cutting the label web whilst on the cutting drum. For example, apart from the cutting blade arrangements described above, any sharp edged or pointed devices or instruments, heated devices or appliances, water, ultrasonic or laser cutting devices, or devices for perforating and tearing the labels may be used. In addition, the piston described above may be replaced by any other mechanical, electro-mechanical, pneumatic or hydraulic device.

It will be realised that a significant advantage of the invention is that it negates the requirement of a separate cutter drum. It is found that not only does this reduce the complexity of the apparatus in order to achieve the required function, but also diminishes the possibility of adverse effects resulting from inexact speed correspondence of a plurality of rotating drums and the unsuccessful transfer of labels from one drum to another.

Additionally, no label slippage or tensioning is required. Further modifications and improvements may be incorporated without departing from the scope of the invention herein intended.

What is claimed is:

1. Roll-fed labeling apparatus comprising delivery means for delivering a label web to a rotary cutting drum, and one or more cutting assemblies located on the cutting drum providing cutting means for cutting with a slicing action the label web into individual labels while the label web is held by a relatively negative pressure on the circumferential surface of the drum, wherein each cutting assembly comprises a piston arranged to move the cutting means along a slot on the cutting drum to enable the slicing action to take place, and wherein the slicing action is not dependent upon a surface auxiliary to the cutting means.

2. Roll-fed labelling apparatus as claimed in claim 1, wherein the cutting means comprises a sharp edge or pointed device.

3. Roll-fed labelling apparatus as claimed in claim 1, comprising a plurality of cutting assemblies spaced apart circumferentially around the drum by a distance approximately equal to the label length.

4. Roll-fed labelling apparatus as claimed in claim 1, wherein the delivery means in use, delivers the label web to the cutting station under a low or negligible tension.

5. Roll-fed labelling apparatus as claimed in claim 1, further comprising an adhesive applicator provided in close proximity to the rotary cutting drum to enable labels to receive adhesive prior to their transfer to their respective containers.

6. Apparatus as claimed in claim 5, wherein the adhesive applicator comprises means for spraying adhesive onto the back faces of the labels.

7. Apparatus as claimed in claim 6, wherein the adhesive applicator has means for pulsing the spray such that the adhesive is ejected only onto the leading and trailing edges of the labels.

8. Apparatus as claimed in Claimed in claim 6, wherein the adhesive applicator is arranged to spray the adhesive in a pattern such that the leading and trailing edges of adjacent labels are applied with adhesive in a single action.

9. Roll-fed labelling apparatus as claimed in claim 1, wherein each cutting means is a heated device.

10. Roll-fed labelling apparatus as claimed in claim 1, wherein each cutting means is a laser-cutting device.

11. Roll-fed labelling apparatus as claimed in claim 1, wherein each cutting means is an ultrasonic device.

12. Roll-fed labelling apparatus as claimed in claim 1, wherein the cutting means comprises a cutting blade or force that moves with a net relative velocity in relation to the label web during the cutting action.

13. Roll-fed labelling apparatus as claimed in claim 1, further comprising an adhesive applicator having means for spraying adhesive on to the back faces of the labels while said labels remain on the circumferential surface of the drum.

14. Roll-fed labelling apparatus comprising delivery means for delivering a label web to a rotary cutting drum, and one or more cutting means located on the cutting drum for cutting with a slicing action the label web into individual labels while the label web is held by a relative negative pressure on the circumferential surface of the drum, wherein the cutting means passes from a first edge of the label web to a second edge during the slicing action, with the cutting means making point contact with the label web at any one point in time during said slicing action, and wherein the cutting action is not dependent upon a surface auxiliary to the cutting means, and further comprising an adhesive applicator provided in close proximity to the rotary cutting drum to enable labels to receive adhesive prior to their transfer to their respective containers, and wherein the adhesive application comprises means for spraying adhesive onto the back faces of the labels, and wherein the adhesive applicator is arranged to spray the adhesive in a pattern such that the leading and trailing edges of adjacent labels are applied with adhesive in a single action.

* * * * *